June 20, 1939. T. L. THURLOW 2,162,767
AVERAGING DEVICE FOR OBSERVATION INSTRUMENTS
Filed Aug. 3, 1937    3 Sheets-Sheet 1
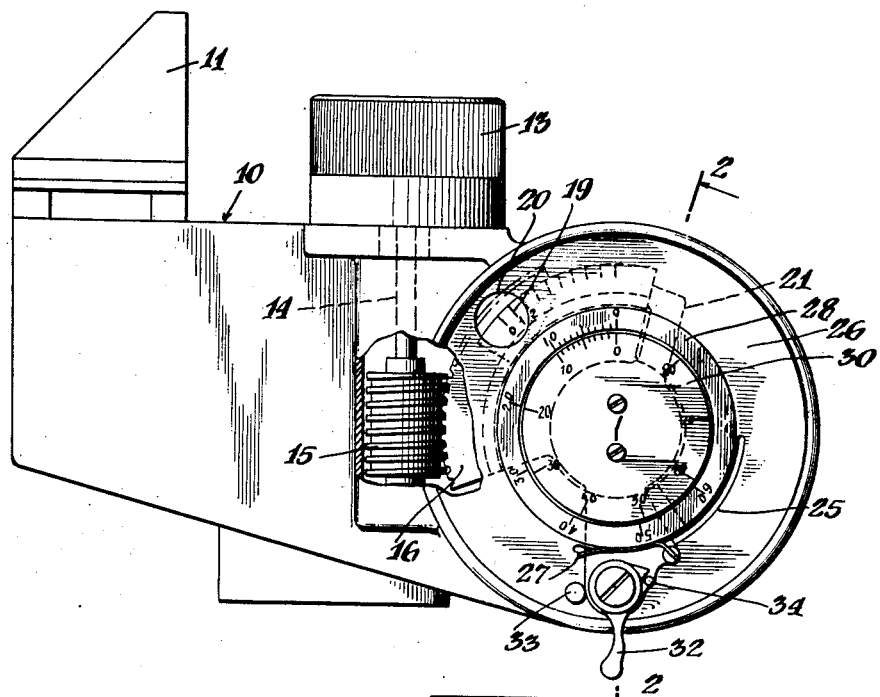
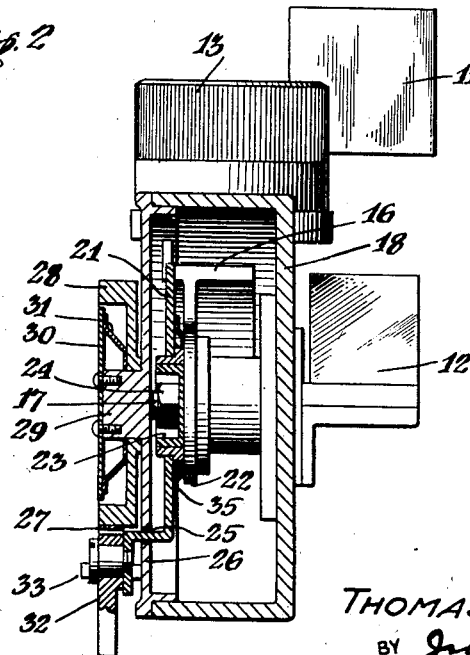
INVENTOR
THOMAS L. THURLOW
BY
ATTORNEYS

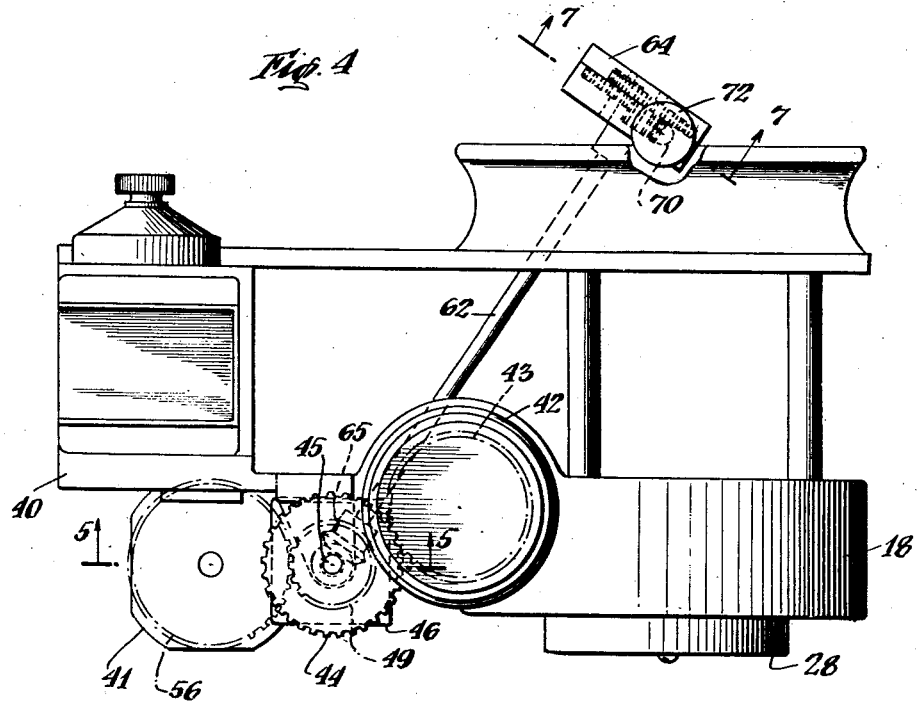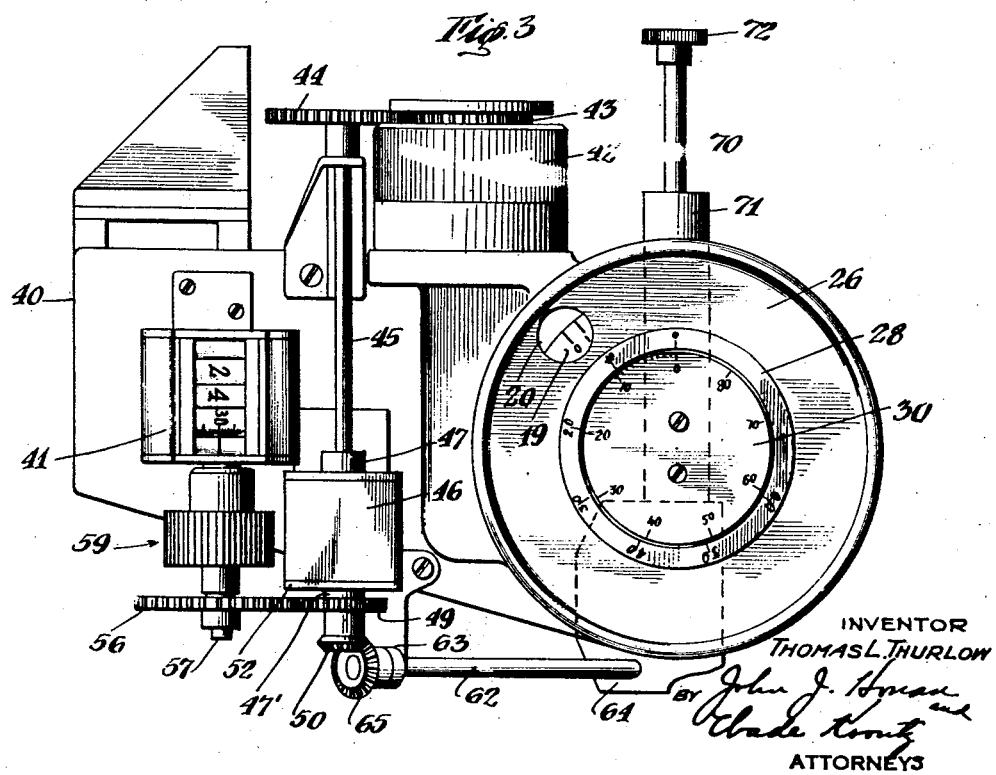

June 20, 1939.　　　T. L. THURLOW　　　2,162,767
AVERAGING DEVICE FOR OBSERVATION INSTRUMENTS
Filed Aug. 3, 1937　　　3 Sheets-Sheet 3
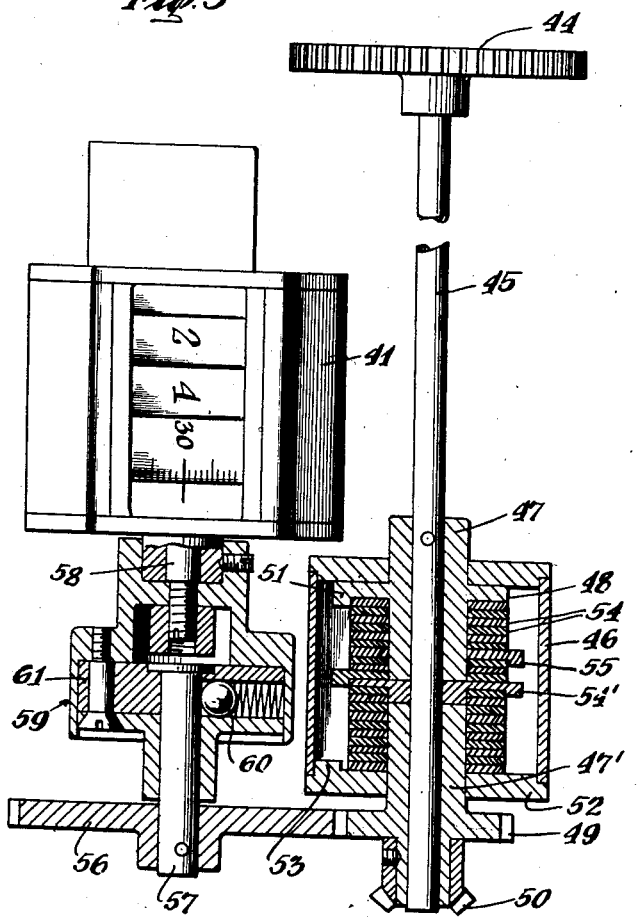
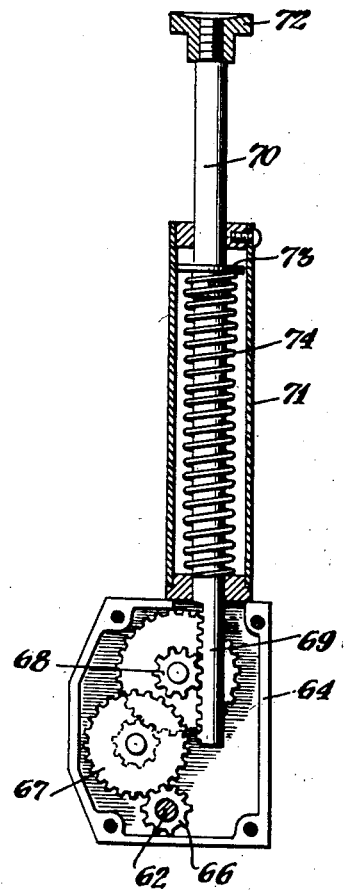
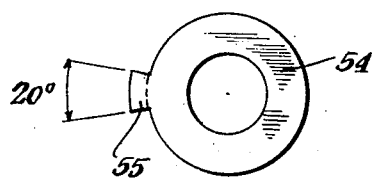
INVENTOR
THOMAS L. THURLOW
BY
ATTORNEYS Patented June 20, 1939

2,162,767

UNITED STATES PATENT OFFICE 2,162,767

AVERAGING DEVICE FOR OBSERVATION INSTRUMENTS

Thomas L. Thurlow, Dayton, Ohio

Application August 3, 1937, Serial No. 157,163

4 Claims. (Cl. 33—70)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to calculating instruments, and has particular reference to an averaging device for automatically and directly providing the arithmetical average of a predetermined number of observations, readings, or indications of the calculating instrument.

In making observations, readings, or measurements dependent upon the human faculties it is customary to take several of such observations, readings, or measurements and average them in order to more nearly approach precise accuracy. The usual method is to total the several readings and average them mathematically, which involves time and additional labor, and frequently conditions are such that this procedure is difficult to perform, particularly where celestial observations are made from aircraft and the like.

In accordance with the present invention, a direct reading averaging device is provided for use on calculating instruments, particularly observation instruments such as sextants, octants, transits, theodolites, or other angle- or distance-measuring devices and the like, in which each measurement is accompanied by a recorded predetermined fraction of the approximate measurement sought, these fractions being arithmetically added as recorded for each successive reading until the predetermined number of measurements have been made, whereupon the total thereof appears directly on an indicator as the arithmetical mean of all of the individual measurements.

In one form of the invention, the individual measurement is represented by the adjusted position of a suitable member serving as a stop, against which an indexing element is moved after each measurement through a predetermined angle or distance and which in turn moves a recording member through a predetermined fraction of the angle or distance that represents the whole measurement sought, so that the added fractional increments represent the arithmetical mean of all the individual measurements. The indicator is preferably fitted with a vernier, whereby the average measurement can be accurately read off directly.

In a modified form of the averaging device of this invention, the individual measurements displace successive interacting discs, the return movement of which records a predetermined fractional increment of the whole measurement on a suitable counter-indicator, which accordingly is indexed further for each such recorded increment until all predetermined increments, as represented by individual measurements, have been recorded, whereupon the counter-indicator directly indicates the arithmetical average of all of the individual measurements.

It will be seen that the averaging devices of the present invention provide accurate and simple means for that purpose, which may be attached or built into existing forms of observation and like instruments with little or no material change thereto, and which provide a direct reading thereon of the average of numerous trial readings without requiring calculation to obtain the average.

For a more complete understanding of the invention, reference may be had to the accompanying drawings, in which:

Figure 1 is an elevation, shown partly in section, of one form of the averaging device of this invention, illustrated by way of example as attached to an octant;

Fig. 2 is a vertical section therethrough as seen along the line 2—2 of Fig. 1;

Fig. 3 is an elevation of another form of the averaging device of this invention, also shown by way of example as attached to an octant;

Fig. 4 is a plan view thereof;

Fig. 5 is an enlarged vertical section through the measurement setting and a portion of the recording mechanism, as seen along the line 5—5 of Fig. 4;

Fig. 6 is an enlarged view of one of the setting discs; and

Fig. 7 is an axial section through another portion of the recording mechanism, as seen along the line 7—7 of Fig. 4.

Referring to the form of the invention illustrated in Figs. 1 and 2 of the drawings, numeral 10 designates a sextant, octant, or other angle measuring or observation instrument. The octant illustrated by way of example is of more or less conventional design, and includes the eyepiece prism 11 by which light from a celestial body is directed to the eye after passing through prism 12, which is angularly adjustable in respect to the horizontal as determined by a level, gyrostat, or the like. The adjustment of the objective prism 12 is effected by means of knob 13 whose shaft 14 is fitted with a worm 15 meshing with a sector 16 secured to index shaft 17 journalled in housing 18 and carrying the objective prism 12. The sector 16 is provided with a scale 19 graduated in degrees and minutes of angle and visible through peep-hole 20 provided with a suitable index mark.

A diametrical oscillating arm 21 is suitably secured by welding, brazing or soldering, for example, to a shouldered collar 22 journalled on cupped washer 23 secured to index shaft 17 by means of nut 24. The upper end of oscillating arm 21 is adapted to abut the end of sector 16 and its lower end projects laterally through an articulate slot 25 in cover plate 26 and carries a flexible clutch shoe 27 which is adapted to frictionally engage the periphery of cupped vernier disc 28 journalled on a projection 29 of cover plate 26, to which fixed disc 30 is also secured. A friction spring 31 interposed between vernier disc 28 and fixed disc 30 serves to hold the former in any angular position with respect to the latter.

Pivoted on oscillating arm 21 is a cam lever 32, which is so shaped that, when moved in a counterclockwise direction, it engages the shoe 27 to force the latter into frictional engagement with the edge of the vernier disc 28 and when released it in turn releases shoe 27 from the vernier disc. A fixed stop 33 on cover plate 26 limits the movement of the oscillating arm 21 in a clockwise direction and a second stop 34 carried by oscillating arm 21 limits the movement of the cam 32 in a counter-clockwise direction so that it cannot bind or wedge against the friction shoe 27, which is biased toward disengaged position. Movement of the oscillating arm 21 in a counter-clockwise direction is limited by the engagement of its upper end with the side of sector 16. Thus, when cam lever 32 is moved from stop 33 in a counter-clockwise direction it frictionally connects lever 21 by shoe 27 to the vernier disc 28 and the latter is moved until the upper end of oscillating arm 21 engages sector 16 and the movement of arm 21 and consequently of vernier disc 28 is stopped. Return movement of lever 32 in the clockwise direction to stop 33 does not affect the position of vernier disc 28 since then the friction shoe 21 is disengaged therefrom and it is held in advanced position by spring 31. A spring 35 interposed between arm 21 and the rear surface of cover plate 26 serves to hold oscillating arm in adjusted position.

In the particular arrangement illustrated in Figs. 1 and 2, eight observations have been selected as requisite to complete an average reading, thus requiring eight step-by-step movements of vernier disc 28, one for each observation, making the angle of each successive movement of vernier disc 28 equal to one-eighth the total movement, plus or minus any variation introduced by the variation in adjusted position of sector 16. Inasmuch as vernier disc 16 is thus rotated one-eighth of the total angle, the maximum of which is 90° from the horizontal, the fixed disc 30 is so graduated that the corresponding fraction of the altitude is recorded at each movement, that is, it is graduated in 1° divisions and ninety divisions complete the circle. Thus, when eight altitude observations are recorded in the manner described, the total reading of the fixed disc 30 and the vernier movable disc 28 is the arithmetical mean of the eight recorded observations. The average position of the index shaft 17 as rotated by knob 16 in accordance with the observed angles is accordingly obtained from a pre-selected number of its instantaneous positions, for example, the eight positions mentioned, although it is to be understood that a greater or less number of observations may be averaged by proportionate corresponding variations in the construction of the instrument.

In the second form of the averaging calculating device of this invention illustrated in Figs. 3 to 7 inclusive, the octant 40 is provided with an odometer type of counter 41. The adjusting knob 42 is provided with a spur gear 43, which meshes with an equal diameter spur gear 44 secured to the upper end of shaft 45 journalled in suitable brackets mounted on the side of the instrument. Shaft 45 accordingly rotates through the same angle as knob 42 but in the opposite direction. It extends through casing 46 and has pinned thereto a collar 47, having an integral washer 48. A second collar 47', coaxial with collar 47, is free to rotate on shaft 45 and is provided with an integral spur gear 49 and bevel gear 50 at its lower end. Washer 48 is provided with a down-turned lateral lug 51 and the base 52 of the casing 46 is provided with a similar, but upturned, lug 53, as shown in Fig. 5.

Interposed between washer 48 and base 52 is a stack of like washers 54, each provided with a downturned lateral lug 55, the width of which is preferably approximately 20° as shown in Fig. 6. These washers 54 are all journalled on collars 47 and 47', except for intermediate washer 54' which is keyed to collar 47'. Thus, rotation of shaft 45 results in rotation of collar 47 and first washer 48, while rotation of spur gear 49 results in rotation of collar 47' and intermediate washer 54', but not vice versa.

When the instrument is set at zero degrees, zero minutes altitude, lug 51 of washer 48 is in engagement with the lug 55 of the next adjacent washer, whose lug 55 in turn engages the lug of the next washer, and so on, the lug of the lowermost washer engaging the stop lug 53 on base 52. Thus, at zero reading, all lugs are in contact and since lower lug 53 is fixed and upper lug 51 is secured to shaft 45, the latter is locked against rotation in a clockwise direction. Also, for each turn of shaft 45 in a counter-clockwise direction through approximately 320°, the lug on the upper washer moves around from one side of the upper lug and engages the lug on the next lower washer, carrying the latter with it, and so on.

Gear 49 on shaft 45 meshes with gear 56 on shaft 57 coaxial with the shaft 58 of counter 41. The ratio of gears 56 and 49 is two to one. Interposed between shafts 57 and 58 is a conventional ball clutch 59, the ball 60 of which is wedged against shaft 57 to couple it to counter shaft 58 only when the former rotates in a counter-clockwise direction. The ball 60 is carried by disc 61 loosely-mounted on shaft 57 and secured to counter shaft 58, as shown in Fig. 5.

A cross-shaft 62 journalled at one end in a bracket 63 on the instrument and at its other end in housing 64, is provided with a bevel gear 65 meshing with bevel gear 50 on collar 47' of shaft 45, and with a spur gear 66 positioned within casing 64, as shown in Fig. 7. Gear 66 is connected by suitable step-up gearing 67 to pinion 68 meshing with rack 69 on the lower end of a plunger 70 within a cylinder 71 extending upwardly from housing 64 and secured to the instrument. The upper end of plunger 70 is provided with a button 72 and also with a collar 73 within cylinder 71, between which and the bottom of cylinder 71 is interposed the spring 74, which normally urges the plunger 70 upwardly.

In operation of the second form of the averaging calculating instrument illustrated in Figs. 3 to 7, inclusive, the rotation of the knob 42 from zero setting for a clockwise direction to measure an angle between zero and 90°, causes shaft 45 to rotate through the same angle but in the opposite direction, i. e., counter-clockwise, one rotation of knob 42 usually being equivalent to 10° elevation in conventional instruments of this nature. Thus, for one turn of knob 42, lug 51 engages lug 55 of the next lower washer 54 at 320° and moves the latter, so that the successive washers are picked up by the preceding ones and the last washer to move at the end of the observation remains in the last position due to the friction between adjacent washers.

By way of example, assume that the octant is set to measure approximately 30°. This results in rotation of first washer 48 through approximately three counter-clockwise revolutions, and the consequent setting of the next three washers 54 below it, due to the interaction of lugs 51 and 55.

In order to record this reading, plunger 70 is depressed to the limit of its travel. This results in rotation of shaft 62, lower collar 47' and intermediate washer 54' in a counter-clockwise direction, washer 54 carrying the washers 54 next above it by reason of the interconnection between their respective lugs 55. This rotation of the washers 54 above 54' is limited to the same angle of displacement and the same direction previously given by shaft 45 to the top washer 48 and the next three below it, because any further movement is stopped by the engagement of the successive lugs 55 against lug 51 of top washer 48, which is locked by the gearing 43, 44.

When plunger 70 is released, spring 74 restores it to original raised position and causes shafts 62, 57 and collar 47' to rotate in the reverse direction. Ball clutch is disengaged and the counter 41 is not disturbed, while washer 54' is rotated in a clockwise direction until the lugs 55 on washers 54 between 54' and base 52 are stacked against the lug 53 of the latter to stop further clockwise rotation.

During the first rotation of collar 47', gear 49 attached thereto rotates gear 56 at half speed in a clockwise direction, ball clutch 59 acting to couple shafts 57 and 58 to operate the counter 41 to record the angle, the amount of the record depending on the graduation of the counter cylinders and the ratio of the gears 49, 56. Thus for averaging purposes, the counter cylinders and gear drive therefor are proportioned to the predetermined number of observations it is desired to average. For example, if the instrument is arranged to average ten observations and an angle of approximately 50° is to be measured, knob 42 is rotated approximately five turns from zero setting, causing shaft 45 to rotate the same amount but in the opposite direction.

When each observation is recorded by depressing plunger 70, counter 41, because of its calibration, will record one-tenth of the total reading or approximately five degrees in the selected case. Thus, for ten observations the total altitude recorded by the counter 41 will be the arithmetical average of the fractional increments of the ten observations.

With the form of the averaging arrangement illustrated in Figs. 3 to 7, the average position of an oscillating or rotating shaft can be determined by means of a pre-selected number of recordings, regardless of the number of rotations or oscillations that the shaft makes. No resetting of the washer 54 is required beyond that effected by the recording actuation of the plunger 70. For each set of, say ten, observations to be averaged, the counter 41 is reset to zero position by manually turning clutch disc 61 in a counter-clockwise direction, i. e., in clutch releasing direction, the outer edge of disc 61 being knurled or ridged for that purpose.

While certain preferred embodiments of the invention have been illustrated and described herein, it is to be understood that the invention is not limited thereby, but is susceptible of changes in form and detail within the scope of the appended claims. For example, while stacked interacting discs are preferred in the form of Figs. 3 to 7, other suitable equivalent indexing mechanism, such as a Geneva gear, may be employed with equal facility, and the like.

I claim:

1. In a device for averaging a plurality of measurements of an instrument, the combination of means displaceable in accordance with each measurement by the instrument, a pivoted member movable a predetermined degree between said means and a stop, a rotatable scale, a fixed scale cooperating therewith, a friction shoe carried by said member, and a cam on said member cooperating with said shoe upon manual movement toward said shoe to engage said shoe with said rotatable scale to move the same a partial turn, said scale being calibrated to indicate a single measurement of said instrument after a predetermined number of partial turns.

2. In a device for averaging a plurality of measurements of an instrument, the combination of means displaceable in accordance with each measurement by the instrument, a pivoted member movable a predetermined degree between said means and a stop, a rotatable scale, a fixed scale cooperating therewith, and friction means associated with said member and manually operable to effect rotation of said rotatable scale upon rotation of said pivoted member through a number of degrees exactly equal to the degree of rotation of said pivoted member, said scale being calibrated to indicate a single measurement of said instrument after a predetermined number of partial turns.

3. In a device for averaging a plurality of measurements of an instrument, the combination of means displaceable in accordance with each measurement by the instrument, a pivoted member movable a predetermined degree between said means and a stop, a rotatable scale, a fixed scale cooperating therewith, and a friction shoe carried by said member and manually operable to engage said rotatable scale to move the same a partial turn, said scale being calibrated to indicate a single measurement of said instrument after a predetermined number of partial turns.

4. In a device for averaging a plurality of measurements of an instrument, the combination of means displaceable in accordance with each measurement by the instrument, means movable between said first-mentioned means and a stop by an amount less than a single measurement of the instrument, cooperating fixed and rotatable scale means, and a friction member associated with one of said means and adapted to cooperate with another of said means upon manual operation thereof to effect relative movement between said fixed and rotatable scale means of an amount equal to said above-mentioned amount, said scale means being calibrated to indicate a single measurement of said instrument after relative movement has been effected between said scale means a predetermined number of times.

THOMAS L. THURLOW.